UNITED STATES PATENT OFFICE.

SOMMERFIELD ENEY, JR., OF CHICAGO, ILLINOIS.

PROCESS OF MANUFACTURING PASTRY-SHORTENING.

1,288,853.  Specification of Letters Patent. Patented Dec. 24, 1918.

No Drawing.  Application filed April 21, 1917. Serial No. 163,604.

*To all whom it may concern:*

Be it known that I, SOMMERFIELD ENEY, Jr., citizen of the United States, residing at Chicago, in the county of Cook and State of Illinois, have invented certain new and useful Improvements in Processes for Manufacturing Pastry-Shortening; and I do hereby declare the following to be a full, clear, and exact description of the invention, such as will enable others skilled in the art to which it appertains to make and use the same.

This invention relates to a lard substitute or shortening, and the method of manufacturing the same, and has for an object to provide a material of substantially the consistency of lard, and adapted to perform the functions of lard in the ordinary shortening condition, but composed of cheaper and more healthful ingredients.

A further object of the invention is to produce a material comprising a mixture of beef oil and corn oil in the proper proportions and under the proper conditions to produce the desirable shortening referred to.

The beef oil is produced in any usual, well-known manner as, for instance, by being rendered, and the oil expressed from the solid residue; while the corn oil employed is the corn oil of commerce, marketed under various trade names.

In carrying into effect the present invention, the beef oil and the corn oil, preferably in proportion of two parts of the said beef oil to three of the corn oil, are mixed together in a suitable receptacle, while the temperature of the mixture is raised to about 240° F. The said mixture is then preferably removed from the receptacle in which it has been heated, and is placed in a mechanical agitator provided with some cooling means, as for instance, a water jacket, and is therein subjected to agitation until the temperature of the mixture has fallen to about 95° F. The mixture is then preferably removed to a second mechanical agitator not provided with an artificial cooling means, but subjected only to atmospheric temperature, and in such second agitator the mixture is agitated until the temperature of such mixture has fallen to about 85° F. At this temperature the mixture is of semi-fluid consistency. The material is then removed from such second agitator and placed in the containers in which it is to be marketed. Preferably the filled containers are allowed to remain open to the air for ten or twelve hours, or until the mixture has thoroughly cooled and solidified to about the consistency of lard under like atmospheric and temperature conditions.

I claim:—

The combination of beef oil and corn oil in the proportion of 2 parts of said beef oil and 3 parts of said corn oil.

In testimony whereof I affix my signature.

SOMMERFIELD ENEY, JR.

Copies of this patent may be obtained for five cents each, by addressing the "Commissioner of Patents, Washington, D. C."